US012786059B2

(12) United States Patent
Koh et al.

(10) Patent No.: US 12,786,059 B2
(45) Date of Patent: Nov. 3, 2026

(54) FLEET DEPLOYMENT OF INDUSTRIAL DEVICE CONFIGURATIONS USING NEAR-FIELD COMMUNICATION

(71) Applicant: Rockwell Automation Technologies, Inc., Mayfield Heights, OH (US)

(72) Inventors: See Yong Koh, Singapore (SG); Jeremy Pan Junhong, Singapore (SG); David C. Mazur, Grafton, WI (US); Jonathan A. Mills, Mayfield Heights, OH (US); Scott D. Day, Richfield, WI (US); Patryk Woszczyna, Cracow (PL); Lukasz Gornikowski, Cracow (PL)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 168 days.

(21) Appl. No.: 18/497,719

(22) Filed: Oct. 30, 2023

(65) Prior Publication Data

US 2025/0141741 A1 May 1, 2025

(51) Int. Cl.
*H04L 41/084* (2022.01)
*H04L 41/22* (2022.01)
(Continued)

(52) U.S. Cl.
CPC ............. *H04L 41/084* (2013.01); *H04W 4/80* (2018.02); *H04L 41/22* (2013.01); *H04L 67/12* (2013.01)

(58) Field of Classification Search
CPC ....... H04L 41/084; H04L 41/22; H04L 67/12; H04W 4/80
See application file for complete search history.

(56) References Cited

U.S. PATENT DOCUMENTS 7,543,016 B2 * 6/2009 Carrier ................ H04L 61/5092 709/200
8,805,279 B2 * 8/2014 Choi ........................ H04B 5/72 455/507
(Continued)

OTHER PUBLICATIONS

S. Cheshire. "RFC 5227: IPv4 Address Conflict Detection". Network Working Group, Jul. 2008, 21 pages. (Year: 2008).*
(Continued)

*Primary Examiner* — G. C. Neurauter, Jr.

(57) ABSTRACT

Systems and methods for modifying a configuration of an industrial device using near-field communication (NFC) are provided herein. For example, the method includes receiving, via a graphical user interface (GUI) of a software application, a configuration schema for a group of industrial devices. The configuration schema includes a parameter and a range of available values for the parameter for each industrial device of industrial devices. The method also includes determining, by the software application installed on a client device, a configuration for a respective industrial device within the group of industrial devices based on the configuration schema, where the configuration includes a value selected from the range of available values for the parameter and the value is selected based on an order of transmission of the configuration to the respective industrial device. The method also includes transmitting, via NFC from the client device to the respective industrial device, the configuration.

20 Claims, 7 Drawing Sheets

(51) Int. Cl.
*H04L 67/12* (2022.01)
*H04W 4/80* (2018.01)

(56) References Cited

U.S. PATENT DOCUMENTS

| | | | | |
|---|---|---|---|---|
| 9,042,826 | B2 * | 5/2015 | Confer | H04B 5/20 455/41.2 |
| 9,563,188 | B2 * | 2/2017 | Banerjee | G05B 19/41845 |
| 9,971,327 | B2 * | 5/2018 | Narain | H04W 4/33 |
| 10,006,654 | B2 * | 6/2018 | Shaull | H04W 4/80 |
| 11,741,319 | B2 * | 8/2023 | Sugumar | G06K 7/10009 |
| 11,848,910 | B1 * | 12/2023 | Zou | H04L 41/044 |
| 11,868,752 | B2 * | 1/2024 | Malaspina | G06F 8/61 |
| 11,929,981 | B2 * | 3/2024 | Bhadriraju | H04L 41/0879 |
| 2006/0195610 | A1 * | 8/2006 | Cole | H04L 63/1491 709/245 |
| 2006/0242637 | A1 | 10/2006 | Betarbet | |
| 2008/0077617 | A1 * | 3/2008 | Schulz | G06Q 10/06 |
| 2010/0190442 | A1 | 7/2010 | Citrano | |
| 2015/0287318 | A1 | 10/2015 | Nair | |
| 2016/0259315 | A1 | 9/2016 | Alexander et al. | |
| 2017/0019979 | A1 * | 1/2017 | Ghanoun | H05B 47/165 |
| 2017/0195827 | A1 | 7/2017 | Vasko | |
| 2018/0083916 | A1 * | 3/2018 | Xu | H04L 47/13 |
| 2018/0101152 | A1 | 4/2018 | Jundt et al. | |
| 2018/0279066 | A1 | 9/2018 | Dollinger et al. | |
| 2018/0337822 | A1 * | 11/2018 | Heimes | H04W 4/50 |
| 2018/0357058 | A1 * | 12/2018 | Malaspina | H04L 67/34 |
| 2019/0146447 | A1 | 5/2019 | Albert | |
| 2019/0306020 | A1 | 10/2019 | Corbett et al. | |
| 2020/0019287 | A1 * | 1/2020 | Sahai | G06F 3/0484 |
| 2020/0026505 | A1 * | 1/2020 | Olderdissen | G06F 9/44526 |
| 2021/0064712 | A1 | 3/2021 | Xu | |
| 2023/0052998 | A1 | 2/2023 | Kande | |

OTHER PUBLICATIONS

Extended EP Search Report issued in EP application No. 24208445.7 on Mar. 14, 2025, 10 pages.
Extended EP Search Report issued in EP application No. 24208085.1 on Mar. 18, 2025, 11pages.
Non-Final Office Action mailed by USPTO on Jan. 20, 2026 in U.S. Appl. No. 18/497,711, 17 pages.

* cited by examiner

FLEET DEPLOYMENT OF INDUSTRIAL DEVICE CONFIGURATIONS USING NEAR-FIELD COMMUNICATION

TECHNICAL FIELD

Aspects of the disclosure are related to the field of industrial devices within industrial applications, in particular, to deployment of industrial device configurations using near-field communication (NFC).

BACKGROUND

In the realm of industrial applications, configuring industrial devices is a pivotal technical endeavor that involves tailoring the settings and parameters of industrial devices to suit specific operational needs. System developers design the configurations to optimize performance, energy efficiency, and safety across a wide array of industrial machinery. The process typically encompasses setting parameters like motor speed, torque limits, acceleration and deceleration profiles, and control modes to align with the precise demands of the application. Moreover, industrial device configurations often integrate sophisticated control algorithms and communication interfaces to enable seamless integration into larger automation systems, such as programmable logic controllers (PLCs) or supervisory control and data acquisition (SCADA) systems. This technical customization not only ensures that the industrial device function in harmony with other equipment but also enhances overall system reliability and the ability to respond to real-time production variations, making it a fundamental aspect of modern industrial automation.

Configuring industrial devices, however, can be a burdensome task. Currently, a worker has to individually configure each industrial device by physically connecting a handheld device, such as a laptop or tablet, to the industrial device. Generally, each industrial device takes 5-10 minutes to configure. Since industrial applications, such as operation or manufacturing facilities typically house hundreds if not thousands of industrial devices, individually configuring each industrial device is time intensive. Moreover, since industrial devices are generally configured after they are installed in the field or facility, a worker performing the configuration typically has to don personal protection equipment (PPE), thereby adding to the time intensity of the configuration process.

Moreover, since industrial devices are located within an industrial application, access to the industrial devices for the configuration process can be complicated and at times unsafe. For example, industrial devices located within an oil refinery may be located in areas containing noxious fumes or dangerous equipment. As such, accessing the industrial devices or remaining for extended periods of time within the facility to physically connect to the industrial device for configuration purposes, poses safety and health concerns for the configuring worker.

Accordingly, there is a need for improved systems and methods for configuring industrial devices within industrial applications.

SUMMARY

Technology disclosed herein includes software applications and services for modifying a configuration of an industrial device using short-range protocol communications, such as near-field communication (NFC). In particular, the configuration process provided herein allows for deployment of configurations for a fleet or group of industrial devices using NFC. In an aspect, the configuration process includes receiving, via a graphical user interface (GUI) of a software application, a configuration schema for the group of industrial devices. The configuration schema includes a parameter and a range of available values for the parameter for each industrial device of the group of industrial devices.

The configuration process also includes determining, by the software application installed or executed by a client device, a configuration for a respective industrial device in the group of industrial devices based on the configuration schema. As will be described in greater detail below, the configuration includes a value that is selected from the range of available values for the parameter based on an order of transmission of the configuration to the respective industrial device. Once determined, the configuration is transmitted via NFC from the client device to the respective industrial device. Upon receipt of the configuration, the industrial device updates a current configuration to the configuration received via the transmission.

As will be expanded on below, the configuration processes provided herein allow for fleet deployment of configurations to industrial devices without requiring physical connection with each industrial device. In fact, the configuration processes can even allow configuration for a group of industrial devices, even when the industrial devices are in a powered-off state. As such, the configuration process provided herein provides for safer, faster, and more efficient configuration of a group of industrial devices.

This Summary is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
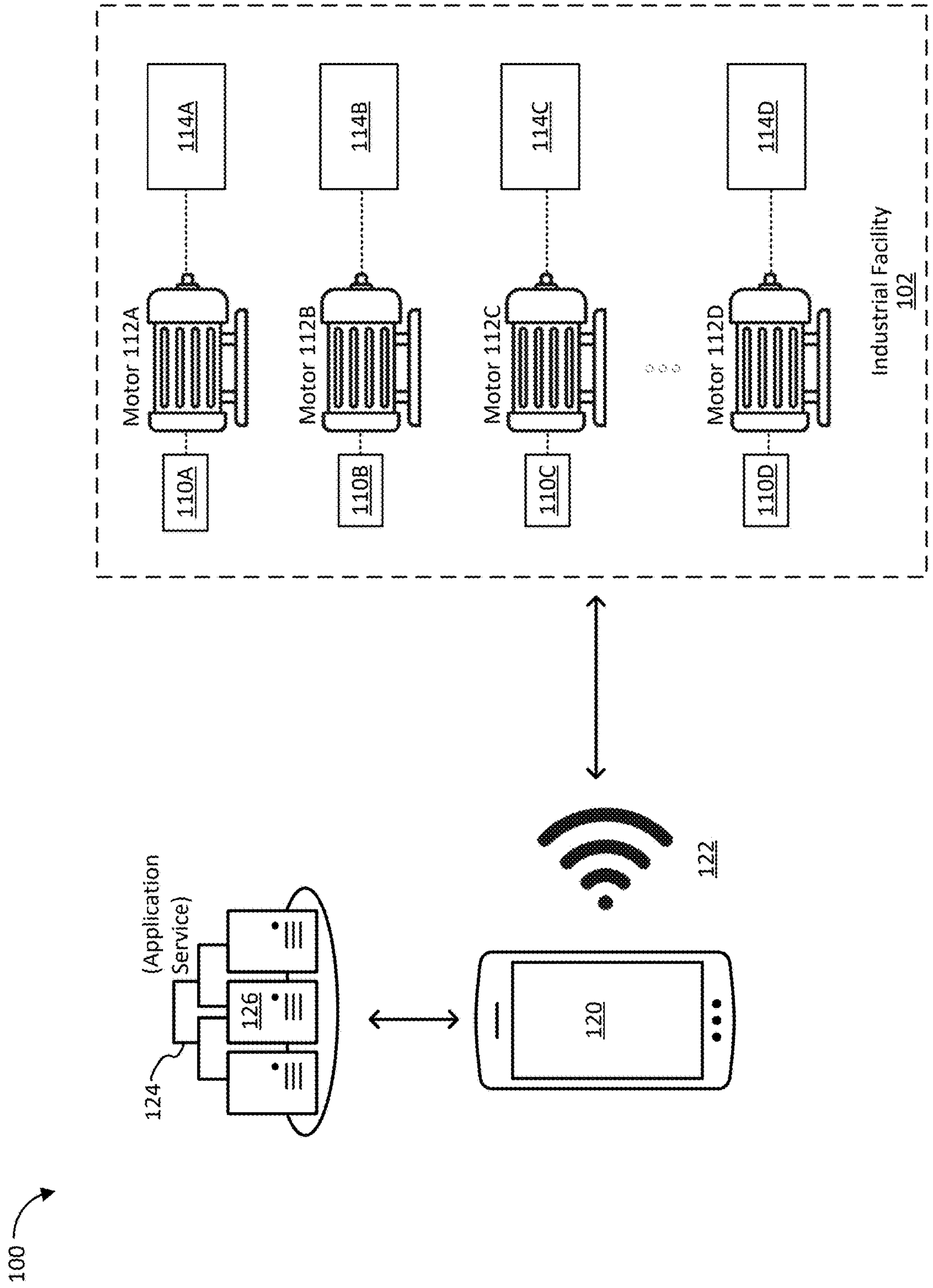
FIG. 1 illustrates an environment for providing a configuration process for configuring a group of industrial devices, according to an embodiment herein.

As noted above, configuring industrial devices within industrial applications using conventional techniques is time intensive, burdensome, and at times, unsafe. Generally, industrial applications, such as production facilities, include hundreds if not thousands of industrial devices. Industrial devices perform a variety of functions within industrial applications, including operating and controlling processes within the industrial application. A common example of an industrial device is a drive. Drives, such as motor drives, optimize performance, safety, and energy efficiency of industrial machinery, such as conveyors, pumps, and robotic equipment. Other examples of industrial devices can include, but are not limited to, actuators, controllers, instrumentation, and the like.

An important part of utilizing an industrial device is the configuration process. Configuring an industrial device involves tailoring a variety of settings and parameters for the industrial device based on the specific application of the industrial device. That is, the settings and parameters for an industrial device are configured to meet the specific requirements of an operation process. For example, configuration for an industrial device can include operating parameters, such as motor speeds, torque limits, load limits, control modes, and the like.

In some cases, configuration of an industrial device includes configuring identification information for the industrial device. Often, industrial devices are integrated into larger automation systems, such as PLCs or distributed communication systems (DCSs). As such, configuring the identification information for the industrial device can be a vital part of the overall system configuration process. For example, if the industrial application includes 50 motor drives, each running a different part of the industrial process, configuring each motor drive to have individual identification information is important for controlling the overall system. In other words, since each motor drive likely requires different operational parameters, being able to readily and easily identify what motor drive is associated with what piece of industrial equipment or part of the industrial process is important.

As noted above, current methods of configuring industrial devices require a client device, such as a laptop or tablet, to physically connect to an industrial device to perform the configuration process. Once connected, traditional configuration processes generally take between five and 10 minutes. Since industrial facilities commonly have hundreds if not thousands of industrial devices, configuring industrial devices is often time and cost intensive.

Moreover, because industrial devices are installed within manufacturing or industrial facilities, accessing and spending extended periods of time at the location of the industrial devices can post health and safety risks. For example, many manufacturing facilities contain dangerous equipment that can pose risks to workers who are performing the configuration process or industrial devices within the manufacturing facility are placed in locations at make accessing them dangerous. Accordingly, there is a need for improved techniques for configuring industrial devices within industrial applications.

To provide a safe and effective process for configuration of industrial devices within industrial applications, improved systems and methods are provided herein. Specifically, techniques for deployment of industrial device configurations using short-range communication protocols, such as NFC or Bluetooth, are provided herein. As will be described in greater detail below, the configuration processes using short-range communication protocols provided herein allow for configuration of an industrial device without requiring physical connection between the industrial device and the client device providing the information associated with the configuration. Moreover, these configuration processes allow a user to select a schema for the configuration ("configuration schema") and automatically generate a set of configurations for a grouping of industrial devices. In other words, the configuration process automatically generates an individual configuration for each industrial device in a group of industrial devices based on a configuration schema selected by the user.

Once a configuration schema is selected, and, optionally, an incrementation between configurations of temporally adjacent industrial devices, the configuration process described herein allows a user to simply connect with each industrial device using a short-range protocol connection and a respective configuration is transmitted to the respective industrial device. As such, a user performing the configuration process (the "configuring user") can configure a group of industrial devices in a matter of minutes, as opposed to the 5-10 minutes per industrial device required by traditional configuration techniques. For example, using NFC as the connection protocol, the user can use a mobile device executing the software that applies the configuration to tap each industrial device, one after another, to apply the configuration to the industrial device. When any part of the configuration is set to increment (e.g., an internet protocol (IP) address), the configuration information increments with each tap.

The configuration processes provided herein do not require an industrial device to be in a powered-on state. As such, an industrial device can be configured without power (e.g., in a powered-off state). Because the industrial devices can be in a powered-off state when configured, the industrial device does not need to be installed within an industrial application. That is, generally, an industrial device is not powered on until it is installed in the field or at the facility. As such, conventional configuration techniques generally are performed after the industrial device is installed. Since the configuration processes provided herein can be performed while the industrial device is in a powered-off state, these configuration processes allow the industrial devices to be configured before being installed. In an exemplary scenario, the configuration processes provided herein can configure industrial devices while the industrial devices are still in packaging, such as boxes, as received from their producing facility.

Configuring industrial devices using the disclosed techniques offers many benefits. Not only does the configuration process provided herein save time by allowing workers to quickly and efficiently configure industrial devices, but the techniques also provide a safer means for configuring industrial devices. For example, as described in greater detail below, the configuration techniques herein allow for configuration of industrial devices when the devices are in a powered-off state. This allows configuration of the industrial devices prior to installation of the industrial devices in the field. As can be appreciated, this allows for configuration of industrial devices that would otherwise be installed throughout the field in a single location, thereby providing a safer environment for the configuration process and a more efficient means of configuring the industrial devices. Moreover, the configuration techniques herein provide for automatic implementation of configurations of industrial devices.

Figure 5:
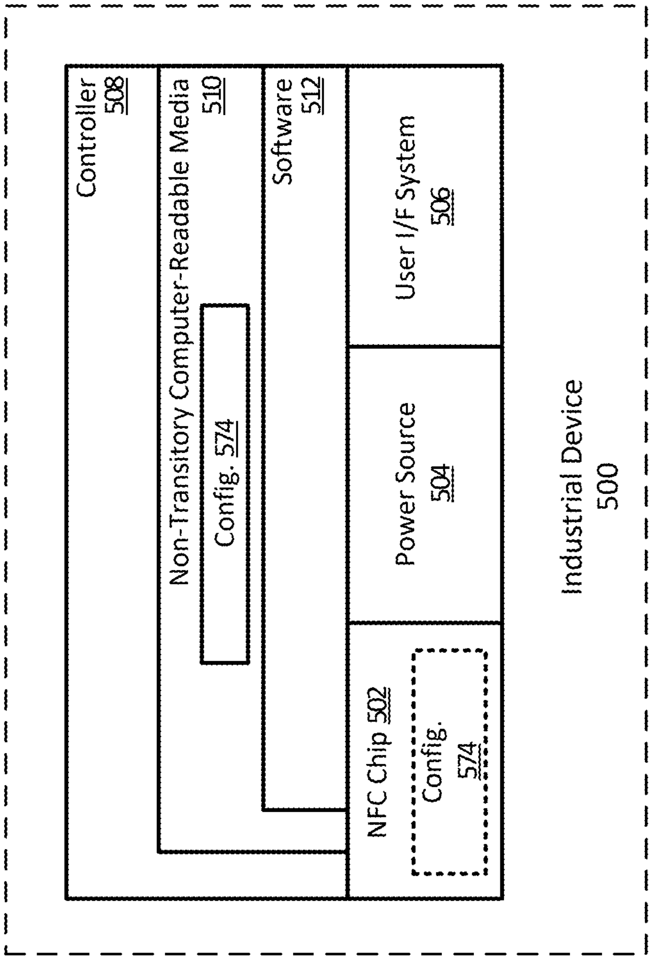
FIG. 5 illustrates an example industrial device, according to an embodiment herein.

Turning now to FIG. 1, FIG. 1 illustrates an environment 100 for providing a configuration process for configuring a group of industrial devices, according to an embodiment herein. As illustrated, the environment 100 includes an industrial facility 102 and a client device 120. The industrial facility 102 includes a group of industrial devices 110A, 110B, 110C, and 110D. The industrial devices 110A-D may be any type of industrial device, such as for example, drives, actuators, compressors, motors, controllers, and the like, of which industrial device 500 in FIG. 5 is broadly representative. It should also be appreciated that the industrial devices 110A-D may not all be the same type of industrial device. Instead, the industrial devices 110A-D may be a combination of different types of industrial devices.

In the illustrated example, the industrial devices 110A-D are drives associated with motors 112A, 112B, 112C, and 112D, respectively. The motors 112A-D may provide mechanical energy to a variety of industrial equipment 114A-114D, respectively. Examples of industrial equipment 114A-114D include a conveyor belt, a pump, or a robotic arm. As can be appreciated, because each of the industrial equipment 114A-114D may require different operating parameters, each respective industrial devices 110A-D may require individualized configuration.

Configuration of the industrial devices 110A-D may determine a variety of information associated with the industrial devices 110A-D. For example, configuration for the industrial devices 110A-D may include operating parameters, such as, motor speed, torque limits, acceleration and deceleration profiles, and control modes. In another example, configuration for the industrial devices 110A-D may include identification and communication parameters, such as internet protocol (IP) addresses, device tag names, I/O information, and the like. In some cases, configuring the identification and communication parameters for the industrial devices 110A-D is an initial configuration step for configuring the operating parameters for a given industrial device. For example, the IP address for the industrial device 110A may first be configured using the configuration process described herein, before the operating parameters for the industrial device 110A are configured.

To configure one or more of the industrial devices 110A-D, the client device 120 first connects with a given industrial device. For ease of explanation, the remaining discussion will be with respect to industrial device 110A. To connect with the industrial device 110A, the client device 110 establishes a short-range protocol connection 122 with the industrial device 110A. Examples of short-range protocol connections include Bluetooth and near-field communication (NFC). As will be described in greater detail below with respect to FIGS. 4A-4H, to establish the short-range protocol connection 122 with the industrial device 110A, the client device 120 may scan a connection tag, such as an NFC tag, a bar code, or a quick response (QR) code, on the industrial device 110A. In some embodiments, the industrial device 110A may transmit a signal, such as a Bluetooth signal that allows the client device 120 to discover and connect with the industrial device 110A.

Figure 6:
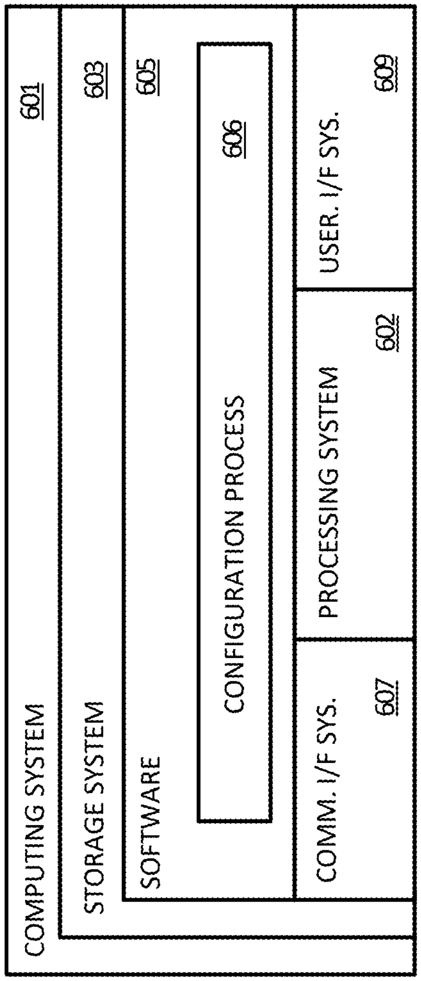
FIG. 6 shows an example client device suitable for providing a configuration process, according to an embodiment herein.

As illustrated, the environment 100 also includes an application service 124. The application service 124 employs one or more server computers 126 co-located with respect to each other or distributed across one or more data centers. Example servers include web servers, application servers, virtual or physical servers, or any combination or variation thereof, of which computing system 601 in FIG. 6 is broadly representative.

The client device 120 communicates with application service 124 via one or more internets and intranets, the Internet, wired and wireless networks, local area networks (LANs), wide area networks (WANs), or any other type of network or combination thereof. Examples of the client device 120 include personal computers, tablet computers, mobile phones, gaming consoles, wearable devices, Internet of Things (IoT) devices, and any other suitable devices, of which computing system 601 in FIG. 6 is also broadly representative.

Broadly speaking, the application service 124 provides software application services to end points, such as the client device 120. The client device 120 can load and execute software applications locally that interface with services and resources provided by the application service 124. The applications may be natively installed and executed applications, web-based applications that execute in the context of a local browser application, mobile applications, streaming applications, or any other suitable type of application. Example services and resources provided by the application service 124 include front-end servers, application servers, content storage services, authorization and authentication services, and the like.

Figure 2:
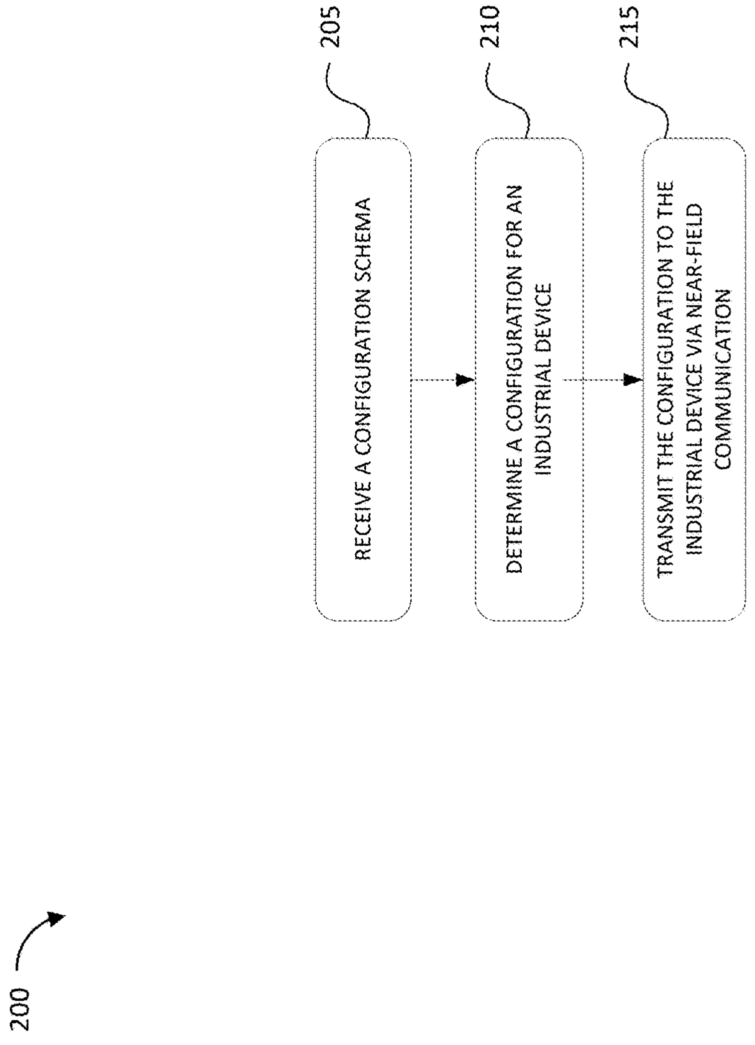
FIG. 2 illustrates a configuration process, according to an embodiment herein.

In the illustrated example, the application service 124 provides the client device 120 with one or more features of the configuration process described herein. The following discussion of the configuration process is made with respect to FIGS. 1-3. Starting with FIG. 2, a configuration process 200 is provided, according to an embodiment herein. For ease of discussion, the configuration process 200 is described with reference to FIGS. 1 and 3, however, it should be appreciated that the configuration process 200 may be performed by components and systems described in any of FIGS. 4-6.

Figure 3:
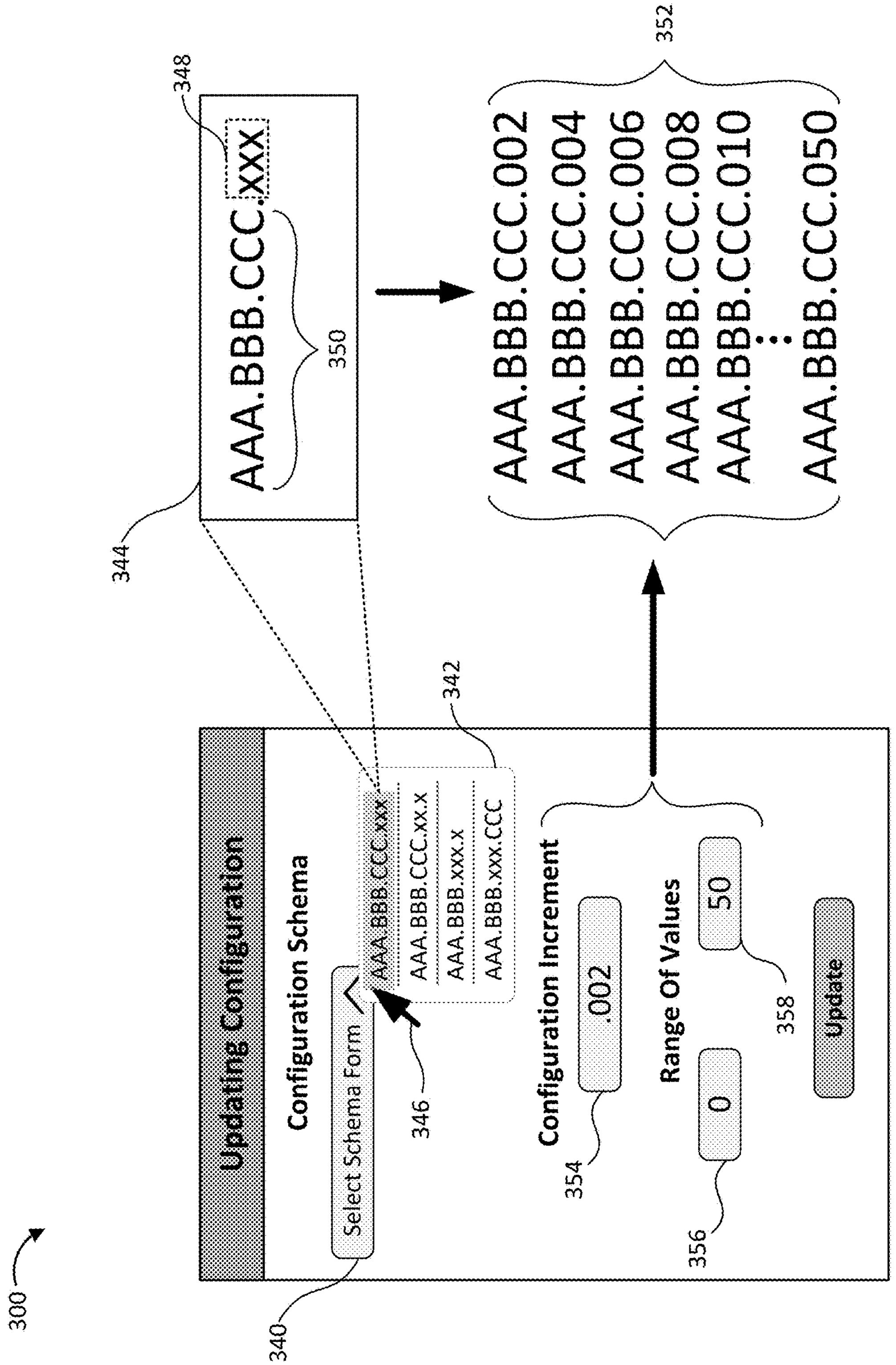
FIG. 3 illustrates an example graphical user interface (GUI) for performing a configuration process, according to an embodiment herein.

As shown, as part of the configuration process 200, a configuration schema is received (205). For example, a user of the client device 120 may select or input a configuration schema into a graphical user interface (GUI) provided on the client device 120. FIG. 3 provides an example GUI 300 for performing the configuration process 200, according to an embodiment herein. The GUI 300 may be provided via the client device 120 by a software application installed on the client device 120. In some embodiments, the software application may be hosted and executed by one or more of the application services 124, as described above. For example, the software application may be a web-based application.

As illustrated by FIG. 3, the GUI 300 allows a user to input a configuration schema. A configuration schema may be the structure or generic form of information that is being configured as part of the configuration process 200. For example, a configuration schema could be a generic IP address, device tag name, I/O tag, etc. For ease of discussion, the configuration is an IP address of the industrial device 110A for the remaining discussion. Broadly speaking, the configuration schema may be a desired IP address with a parameter into which an incrementing value is inserted as configurations for each individual industrial devices 110A-D are generated and assigned. The configuration schema optionally includes a configuration incrementation or the incrementation at which the values for each adjacent industrial device 110A-D are assigned. As will be further described below, a configuration schema includes a structure for the configuration information being configured, including the parameter into which a value, which is selected from a range of values, is inserted at a selected incrementation.

As used herein, the term "adjacent" is meant to encompass temporal proximity between two industrial devices, not physical proximity. In other words, if the industrial device 110A is configured with a first configuration and a first time and the industrial device 110B is configured with a second configuration at a second time, and the second time is the next time directly after the first time, then the industrial device 110A and 110B are considered to be adjacent industrial devices, regardless of their physical proximity to one another.

In some cases, as part of receiving a configuration schema (205), the configuration process 200 includes receiving a selection of a schema form. For example, the GUI 300 includes a schema form selection 340. Upon selection of the schema form selection 340, schema form options 342 may be provided. Although FIG. 3 illustrates the schema form options 342 as a dropdown menu, the schema form options 342 may be provided via GUI 300 in any variety of method, including an input field into which a user can directly input a desired schema form. As illustrated, a schema form can include a variety of options on how the configuration schema could be formatted. For an IP address, schema forms may include AAA.BBB.CCC.xxx, AAA.BBB.CCC.xx.x, AAA.BBB.CCC.xxx.xx, and AAA.BBB.xxx.CCC, wherein letters indicate values assigned by a third party, such as the Internet Assigned Numbers Authority (IANA) or a Regional Internet Registry. The "x" portion of the schema form is a parameter of the configuration into which a value is assigned for a respective industrial device.

In other words, if a user selects a schema form, such as the schema form 344 using cursor 346, then parameter 348 is the portion of the schema form 344 that updates or changes for each industrial device 110A-D. As shown, portion 350 of the schema form 344 remains the same for each configuration in the configuration process 200. The parameter 348, however, changes for each industrial device 110A-D, such that each industrial device 110A-D is transmitted and assigned a unique configuration. For example, configuration array 352 illustrates an array of configurations for a group of industrial devices, such as the industrial devices 110A-D. Each configuration in the configuration array 352 is for a different industrial device, As shown, the portion 350 of each configuration remains unchanged for each of the configurations in the array 352 while the parameter 348 changes for each industrial device. By changing the parameter 348, a unique configuration is generated for each industrial device.

A value inserted into the parameter 348 changes based on a configuration increment 354. A user can select a desired incrementation and the incrementation determines a difference in values for the parameter 348 of configurations for two adjacent industrial devices. In some embodiments, an incrementation of values for the parameter 348 is automatically set, such as by a software application performing the configuration process 200. For example, the parameter 348 may change by an integer increment between configurations of adjacent industrial devices.

The value determined for a given configuration is selected from a range of available values. In some cases, the range of available values is limited to positive integers starting with 1, while in other cases, a user may select the range of available values. As shown in FIG. 3, a user may input a bottom value 356 and a top value 358 for the range of available values. In such cases, values for the parameter 348 may be selected starting at the bottom value 356 and sequentially selected for adjacent industrial devices at an incrementation until the top value 358 is reached.

Once the schema form 340, configuration incrementation 354, and the range of values is determined, then a configuration schema for the configuration process 200 may be determined. That is, upon receiving selections via the GUI 300, the configuration schema for the configuration process 200 is received (205).

Once a configuration schema is received (205), a configuration of an industrial device, such as the industrial device 110A is determined (210). The configuration of the industrial device 110 is determined based on the configuration schema received from the GUI 300. The configuration of the industrial device 110 is also determined based on an order of transmission of the configuration to a respective industrial device. As described above, the value selected for the parameter 348 changes depending on the preceding value of a configuration for an adjacent industrial device. In other words, if a first configuration is generated having a value of "0.002" selected for the parameter 348 and the first configuration is transmitted to the industrial device 110A, then the next value selected for a second configuration to be transmitted directly thereafter may be "0.004." As noted above, the next value selected for the second configuration may also be determined by the incrementation 354.

Once a configuration is determined (210), then the configuration is transmitted to the industrial device 110A (215). For example, the configuration may be transmitted from the client device 120 via a short-range protocol, such as via NFC or Bluetooth, to the industrial device 110A. Upon receiving the configuration, the industrial device 110A updates a current configuration with the received configuration. For example, industrial devices 110A-D often leave a producing factory with factory settings, including factory configurations. As such, when a customer at the industrial facility 102 receives the industrial devices 110A-D, the customer often needs to update the factory configurations to a new configuration.

Importantly, the industrial device 110A does not need to be in a powered-on state to receive the configuration. Instead, the industrial device 110A may be in a powered-off state when the configuration is received. When the industrial device 110A is in a powered-off state and receives the configuration, the industrial device 110A may store the industrial device 110A in an auxiliary location until the industrial device 110A is powered on. When the industrial device 110A is powered on, the industrial device 110A may update the current configuration with the configuration. The industrial device 110A, along with the configuration process 200 for receiving the configuration in a powered-off state and updating a current configuration with the configuration, is described in greater detail with respect to FIG. 5 below.

In some cases, upon receiving the configuration, the industrial device 110A transmits an indication that the configuration was successfully transmitted or received. It is contemplated herein that there may be scenarios in which a configuration generated for the industrial device 110A conflicts with an already existing configuration. For example, a previous configuration process 200 may have generated a configuration that conflicts with a currently generated configuration for the industrial device 110A. In such a case, the industrial device 110A may transmit to the client device 120, or the software application executing the configuration process 200, an error indication. The error indication includes a notification that there is a conflict with the configuration. In such cases, the configuration process 200 may repeat steps 210 and 215. That is, upon receiving the error indication, a second configuration for the industrial device 110A is generated based on a next available value within the range of available values (210), and the second configuration may be transmitted to the industrial device 110A via the client device 120 (215).

Referring now to FIGS. 4A-4H, example GUIs illustrating a flow of a configuration process are provided, according to an embodiment herein. For case of discussion, FIGS. 4A-H are described with reference to FIGS. 1 and 3, however, it should be appreciated that components and systems from any of the remaining Figures may also be used within the described GUIs. The GUIs illustrated in FIGS. 4A-4H may be provided via the client device 120 to a configuration user. Additionally, for illustrative purposes, the following discussion relates to configurations involving IP addresses, however, other types of configurations are equally contemplated. For example, configurations of device tag names or I/O names could be deployed for the group of industrial devices 110A-D following the flow illustrated in FIGS. 4A-H.

Figure 4A:
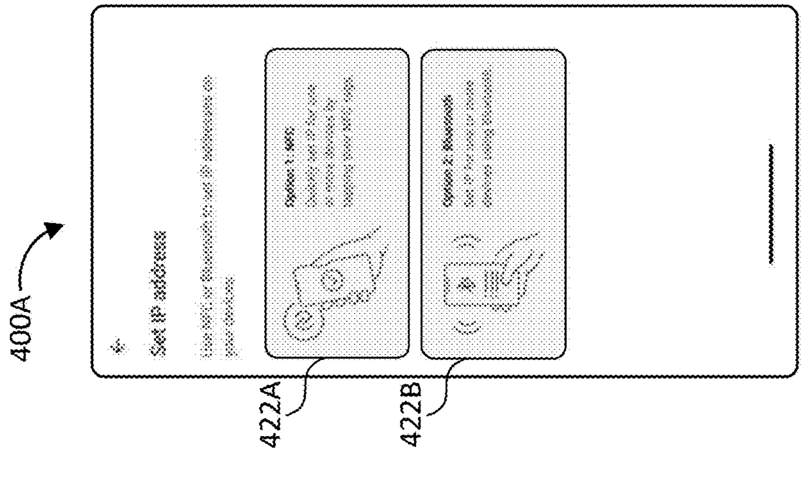
FIGS. 4A-4H illustrate example GUIs for a flow of a configuration process, according to an embodiment herein.

Starting with FIG. 4A, a GUI 400A is illustrated. The GUI 400A may be provided to a user of the client device 120 at the start of the configuration process. As shown, the GUI 400A includes options 422A and 422B for establishing the short-range protocol connection 122 with the industrial device 110A. The option 422A is for establishing an NFC connection with the industrial device 110A and the option 422B is for establishing a Bluetooth connection with the industrial device 110A. As illustrated in FIGS. 4B-H, the option 422A is selected.

Figure 4B:
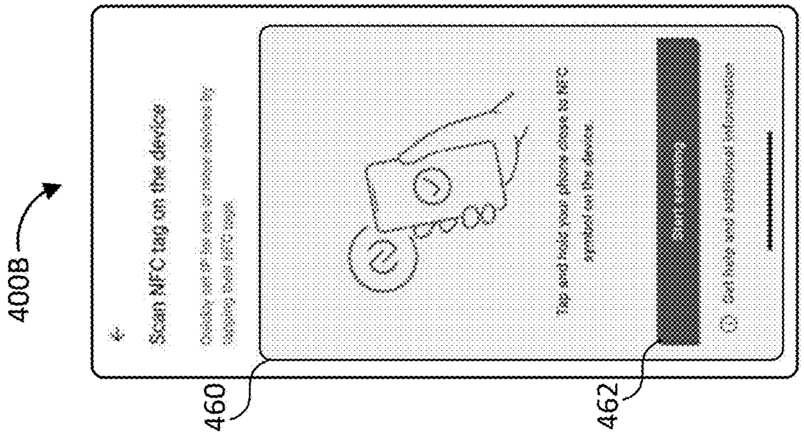
Figure 4C:
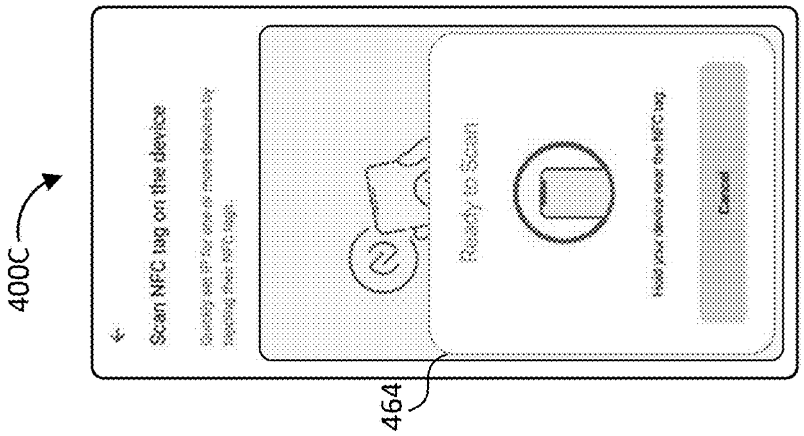

FIG. 4B illustrates GUI 400B showing instructions 460 for establishing an NFC connection between the client device 120 and the industrial device 110A. To establish an NFC connection, the GUI 400B provides the instructions 460 that direct a user to tap and hold the client device 120 close to an NFC tag provided on the industrial device 110A. As described above, the industrial device 110A may have an NFC tag, QR code, or a bar code that allows for quick and easy NFC or Bluetooth connection. Once the client device 120 is close to the NFC tag on the industrial device 110A, the instructions 460 include selection 462 for scanning the NFC tag. Upon selection of the selection 462, the client device 120 may employ a camera or other optical component to scan the NFC tag associated with the industrial device 110A. FIG. 4C illustrates GUI 400C providing an indication 464 that the client device 120 is ready to begin scanning the NFC tag.

Figure 4D:
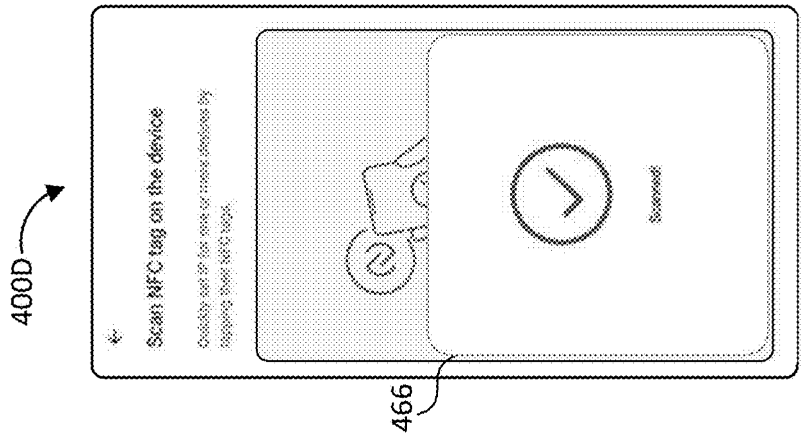

Once the NFC tag associated with the industrial device 110A is scanned, FIG. 4D illustrates GUI 400D providing notification 466 that the industrial device 110A was successfully scanned. The notification 466 may also indicate that the short-range protocol connection 122 is established between the client device 120 and the industrial device 110A.

Figures 4E, 4F, 4G, 4H:
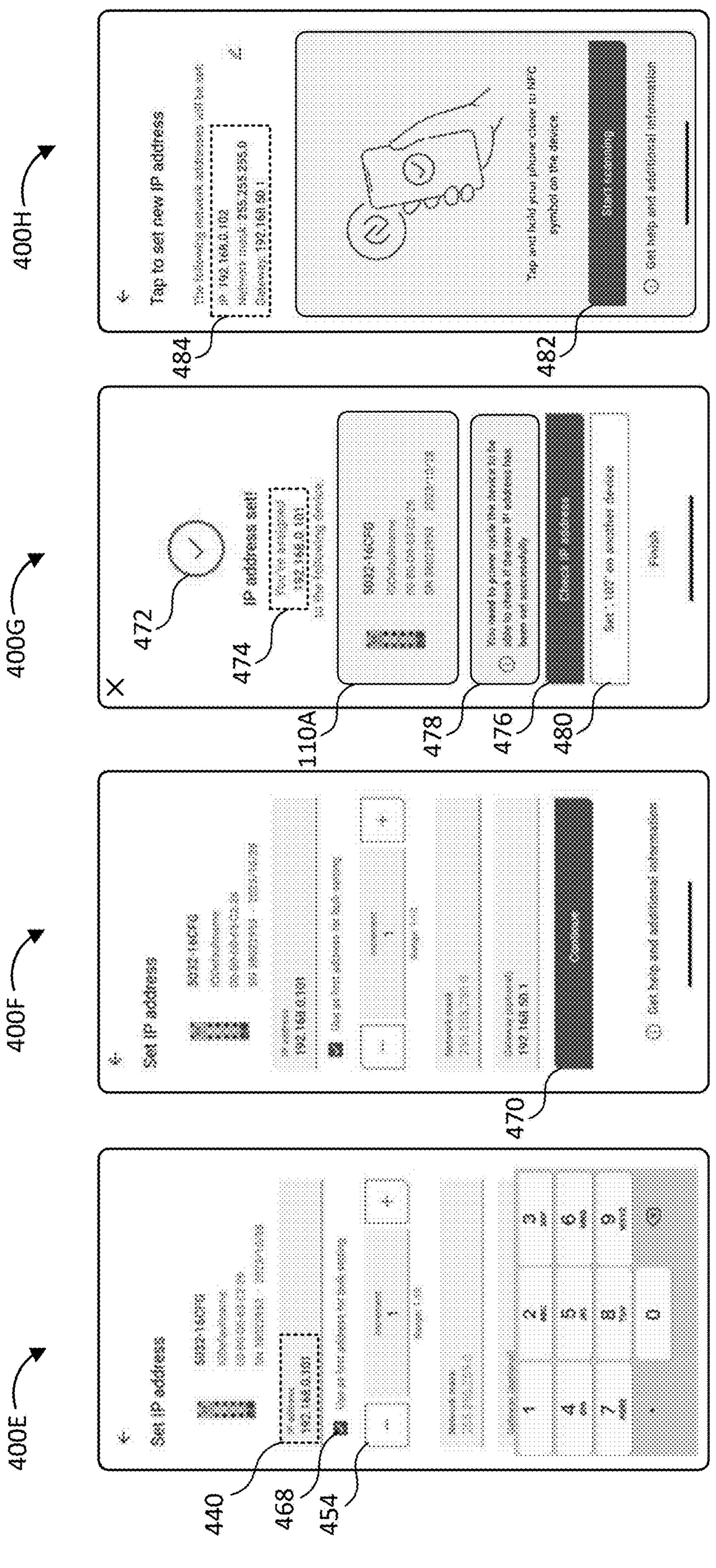

Turning to FIG. 4E, once the short-range protocol connection 122 is established between the industrial device 110A and the client device 120, the GUI 400E may be provided. As illustrated, the GUI 400E includes a schema form 440 selection. Here, the schema form 440 is typed or otherwise inserted into an input field. By providing an input field for the schema form 440, a user can insert a desired format for the schema form 440. As shown, the schema form 440 is for 192.168.0.101. The last three digits of the schema form 440 may be the parameter 348 into which a value is selected for each subsequent configuration transmission. In some cases, the parameter 348 is determined from the schema form 440 by placement of a period. In other words, any digits provided after the last period may be determined to be the parameter 348. Here, "101" is the parameter since these digits follow the last period of the schema form 440.

The GUI 400E also includes the incrementation selection 454. The incrementation selection 454 may be the same or similar to the incrementation selection 354. Also shown by the GUI 400E, an option 368 is provided. The option 368 may be a selection that allows the input schema form 440 to be used as the first configuration in a bulk configuration deployment. That is, if the group of industrial devices 110A-D are to be configured using the configuration schema selected at the GUI 400E, then the configuration for the first industrial device of the group (e.g., industrial device 110A) is determined to be the configuration that is inputted into the schema form selection 440. Each subsequent configuration determined during the configuration process uses the configuration schema form 440 while changing the parameter "0.101" by the incrementation selection 454.

FIG. 4F provides the GUI 400F illustrating the option 470 to continue with the configuration process. Upon selection of the option 470, the configuration is determined based on the configuration schema form 440 and transmitted to the industrial device 110A. It should be appreciated that the GUIs 400E and 400F may be provided before the short-range protocol connection 122 is established. That is, a user may select a configuration schema prior to establishing the short-range protocol connection 122. If that is the case, then selection of the option 470 may result in the GUI 400A being provided to the user. At that point, the user can establish the short-range protocol connection 122 with the industrial device 110A and transmit the configuration to the industrial device 110A.

FIG. 4G provides the GUI 400G illustrating a confirmation 472. The confirmation 472 may confirm that the configuration 474 is successfully transmitted to the industrial device. As illustrated by the GUI 400G, the confirmation 472 indicates that the configuration 474 is assigned to the industrial device 110A. The GUI 400G also provides an option 476 to check the configuration, here, the IP address. Upon selection of the option 476, the assigned IP address may be checked to confirm that it works.

As noted above, in some cases, the configuration 474 may be transmitted to the industrial device 110A when the industrial device 110A is in a powered-off state. If that is the case, then a notification 478 may be provided on the GUI 400G. The notification 478 notifies the configuring user that a power source associated with the industrial device 110A needs to be cycled to confirm or set the configuration. In other words, for the industrial device 110A to update a current configuration with the transmitted configuration, the industrial device 110A needs to be powered-on or have the power cycled.

Since the configuration processes provided herein can be used for bulk deployment of configurations for a group of industrial devices, such as the industrial devices 110A-D, an option 480 is provided on the GUI 400G. The option 480 provides the option to set the next configuration for an adjacent industrial device. For example, upon selection of the option 480, the next configuration may be determined for the industrial device 110B. As shown, since the incrementation is "1," then the parameter for the next parameter is "0.102."

Upon selection of the option 480, GUI 400H of FIG. 4H is provided. As shown, to configure the next adjacent industrial device 110B, the GUI 400H provides option 482 to scan the industrial device 110B to establish a short-range protocol connection 122 with the industrial device 110B.

Once the short-range protocol connection 122 is established between the industrial device 110B and the client device 120, the configuration 484 for the industrial device 110B is determined and transmitted to the industrial device 110B. In some cases, the configuration 484 is determined before the short-range protocol connection 122 is established with the industrial device 110B, while in other cases, the configuration 484 is determined simultaneously to the establishment of the short-range protocol connection 122.

Referring now to FIG. 5, an example industrial device 500 is provided, according to an embodiment herein. As illustrated, the industrial device 500 includes an NFC chip 502, a power source 504, and a user interface (I/F) system 506. The NFC chip 502 is a component that enables short-range protocol connection capabilities for the industrial device 500. For example, the NFC chip 502 may include or be connected to an antenna (not shown) that allows the industrial device 500 to establish the short-range protocol connection 122 with the client device 120. As will be described in greater detail below, the NFC chip 502 may have power harvesting capabilities.

The power source 504 provides power to the industrial device 500 when in a powered-on state. The power source 504 may be or include any variety of power sources, such as batteries, A/C power, D/C power, solar panels, and the like. The user I/F system 506 may be or include a display or UI that allows a user to interact with the industrial device 500, for example, by manually adjusting operating parameters of the industrial device 500.

In some cases, the industrial device 500 may include a controller 508 (e.g., one or more processors), non-transitory computer-readable media 510, and software 512. The software 512 may be operating software that is stored in the non-transitory computer-readable media (CRM) 510 that, when executed by the controller 508, causes the industrial device 500 to perform one or more functions. For example, an operating profile may be stored as instructions in the non-transitory CRM 510 that, when executed by the controller 508, cause the industrial device 500 to operate a piece of industrial equipment (e.g., conveyor belt, motor) according to the operating profile.

As noted above, the industrial device 500 may receive a configuration, such as the configuration 574, from the client device 120 when in a powered-off state. When the industrial device 500 receives the configuration 574 in a powered-off state, the configuration 574 may be temporarily stored by the NFC chip 502. Since the NFC chip 502 has power harvesting capabilities, the NFC chip 502 is able to store the configuration 574 using the residual power harvested by the NFC chip 502. Once the industrial device 500 is powered on, the configuration 574 is transferred to the non-transitory CRM 510 for permanent storage. That is, once the industrial device 500 is powered on, a current configuration that is stored in the non-transitory CRM 510 is updated to the configuration 574. In cases where the industrial device 500 receives the configuration 574 in a powered-on state, then the configuration 574 may be automatically updated and stored in the non-transitory CRM 510.

Turning now to FIG. 6, FIG. 6 illustrates a computing system 601 that may be used for providing one or more functions of the configuration process, as described herein. For example, the client device 120 may be or include the computing system 601. As illustrated, the computing system 601 includes a processing system 602 that includes a microprocessor and other circuitry that retrieves and executes software 605 from storage system 603. The processing system 602 may be implemented within a single processing device but may also be distributed across multiple processing devices or sub-systems that cooperate in executing program instructions. Examples of the processing system 602 include general purpose central processing units, graphical processing units, application specific processors, and logic devices, as well as any other type of processing device, combinations, or variations thereof.

The storage system 603 may comprise any computer readable storage media readable by processing system 602 and capable of storing software 605. The storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations the storage system 603 may also include computer readable communication media over which at least some of the software 605 may be communicated internally or externally. The storage system 603 may be implemented as a single storage device but may also be implemented across multiple storage devices or sub-systems co-located or distributed relative to each other. The storage system 603 may comprise additional elements, such as a controller capable of communicating with the processing system 602 or possibly other systems.

The software 605 (including configuration process 606) may be implemented in program instructions and among other functions may, when executed by the processing system 602, direct the processing system 602 to operate as described with respect to the various operational scenarios, sequences, and processes illustrated herein. For example, the software 605 may include program instructions for providing the configuration process as described herein. For example, the software 605 may include program instructions for providing one or more steps of the configuration process 200.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. The software 605 may include additional processes, programs, or components, such as operating system software, virtualization software, or other application software. The software 605 may also comprise firmware or some other form of machine-readable processing instructions executable by the processing system 602.

In general, the software 605 may, when loaded into the processing system 602 and executed, transform a suitable apparatus, system, or device (of which computing system 601 is representative) overall from a general-purpose computing system into a special-purpose computing system customized to support insights features, functionality, and user experiences. Indeed, encoding the software 605 on the storage system 603 may transform the physical structure of the storage system 603. The specific transformation of the physical structure may depend on various factors in different implementations of this description. Examples of such factors may include, but are not limited to, the technology used to implement the storage media of the storage system 603 and whether the computer-storage media are characterized as primary or secondary storage, as well as other factors.

For example, if the computer readable storage media are implemented as semiconductor-based memory, the software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 607 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between the computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Examples are described herein in the context of systems and methods for configuring industrial devices within industrial applications using NFC. Those of ordinary skill in the art will realize that the following description is illustrative only and is not intended to be in any way limiting. The references made above are to implementations of examples as illustrated in the accompanying drawings. The same reference indicators are used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application and business-related constraints, and that these specific goals will vary from one implementation to another and from one developer to another.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a method of modifying a configuration of an industrial device using near-field communication (NFC), the method comprising: receiving, via a graphical user interface (GUI) of a software application, a configuration schema for a plurality of industrial devices, wherein the configuration schema comprises a parameter and a range of available values for the parameter for each industrial device in the plurality of industrial devices; determining, by the software application installed on a client device, a configuration for a respective industrial device within the plurality of industrial devices based on the configuration schema, wherein: the configuration comprises a value selected from the range of available values for the parameter; and the value is selected based on an order of transmission of the configuration to the respective industrial device; and transmitting, via NFC from the client device to the respective industrial device, the configuration, wherein: the respective industrial device updates a current configuration with the configuration.

Example 2 is the method of any previous or subsequent Example, wherein the configuration is an internet protocol (IP) address for the respective industrial device, and wherein determining, by the software application, the configuration based on the configuration schema for the respective industrial device comprises incrementing to a next available value within the range of available values for the parameter within the IP address.

Example 3 is the method of any previous or subsequent Example, wherein: receiving, via the GUI of the software application, the configuration schema for a plurality of industrial devices further comprises: receiving, via the GUI of the software application, a selection of a schema form, wherein the schema form comprises the parameter; and receiving, via the GUI of the software application, a selection of an incrementation; and the method further comprises: generating, by the software application, the configuration for the respective industrial device by: determining the value based on the incrementation from a preceding value for a previously transmitted configuration; and inserting the value into the parameter of the schema form.

Example 4 is the method of any previous or subsequent Example, wherein receiving, via the GUI of the software application, the configuration schema for a plurality of industrial devices further comprises receiving, via the GUI, a selection of a schema form, wherein the schema form comprises the parameter.

Example 5 is the method of any previous or subsequent Example, wherein: receiving, via the GUI of the software application, the configuration schema for the plurality of industrial devices further comprises: receiving, via the GUI of the software application, an increment selection; and receiving, via the GUI a selection of the range of available values for the parameter; and the method further comprises: generating, by the software application, the configuration schema based on the schema form and the increment selection.

Example 6 is the method of any previous or subsequent Example, wherein determining, by the software application, the configuration based on the configuration schema for the respective industrial device further comprises: determining, by the software application, an incrementation between values within the range of available values; determining, by the software application, a first numerical sequence for a first industrial device within the plurality of industrial devices based on the incrementation and a preceding value transmitted to a respective industrial device; generating, by the software application, the configuration based on the first numerical sequence for the first industrial device; and assigning, by the software application, the configuration to the first industrial device within the plurality of industrial devices.

Example 7 is the method of any previous or subsequent Example, wherein the method further comprises: determining, by the software application, a previous transmission, wherein the previous transmission comprises the first numerical sequence to the first industrial device; determining, by the software application, a second numerical sequence for a second industrial device within the plurality of industrial devices based on the incrementation and the first numerical sequence for the first industrial device; generating, by the software application, a second configuration for the second industrial device based on the second numerical sequence for the second industrial device; and assigning, by the software application, the second configuration to the second industrial device within the plurality of industrial devices.

Example 8 is the method of any previous or subsequent Example, the method further comprising: receiving, by the software application, an error indication from the respective industrial device, wherein the error indication comprises a notification that there is a conflict with the configuration; generating, by the software application, a second configuration for the respective industrial device based on a next available value within the range of available values; assigning, by the software application, the second configuration to the respective industrial device; and transmitting, via NFC from the client device, the second configuration to the respective industrial device.

Example 9 is the method of any previous or subsequent Example, the method further comprising receiving, by the client device, an indication that the configuration was successfully received.

Example 10 is the method of any previous or subsequent Example, wherein a first industrial device of the plurality of industrial devices is in a powered off state, the method further comprising: receiving an indication that the configuration was successfully received, wherein the first industrial device applies the configuration when powered on.

Example 11 is the method of any previous or subsequent Example, wherein the client device is a handheld device.

Example 12 is a non-transitory computer-readable medium comprising processor-executable instructions configured to cause one or more processors to: receive, via a graphical user interface (GUI) on a client device, a configuration schema for a plurality of industrial devices, wherein the configuration schema comprises a parameter and a range of possible values for the parameter for each industrial device in the plurality of industrial devices; determine a configuration for a respective industrial device within the plurality of industrial devices based on the configuration schema, wherein: the configuration comprises a value selected from the range of possible values for the parameter; and the value is selected based on an order of transmission of the configuration to the respective industrial device; and transmitting, via NFC from the client device to the respective industrial device, the configuration, wherein: the respective industrial device updates a current configuration with the configuration.

Example 13 is the non-transitory computer-readable medium of any previous or subsequent Example, wherein the configuration is an internet protocol (IP) address, and the processor-executable instructions to determine the configuration based on the configuration schema for the respective industrial device comprises incrementing to a next available value within the range of available values for the parameter within the IP address.

Example 14 is the non-transitory computer-readable medium of any previous or subsequent Example, wherein a first industrial device of the plurality of industrial devices is in a powered off state, the processor-executable instructions further cause the one or more processors to: receive an indication that the configuration was successfully transmitted, wherein the first industrial device applies the configuration when powered on.

Example 15 is the non-transitory computer-readable medium of any previous or subsequent Example, wherein: the processor-executable instructions to receive, via the GUI, the configuration schema for the plurality of industrial devices are configured to further cause the one or more processors to: receive, via the GUI, a selection of a schema form, wherein the schema form comprises the parameter; and receive, via the GUI, a selection of an incrementation; and the processor-executable instructions are configured to further cause the one or more processors to generate the configuration for the respective industrial device by: determining the value based on the incrementation from a preceding value for a previously transmitted configuration; and inserting the value into the parameter of the schema form.

Example 16 is the non-transitory computer-readable medium of any previous or subsequent Example, wherein the processor-executable instructions to receive, via the GUI, the configuration schema for a plurality of industrial devices are configured to further cause the one or more processors to: receive, via the GUI, a selection of a schema form, wherein the schema form comprises the parameter.

Example 17 is the non-transitory computer-readable medium of any previous or subsequent Example, wherein: the processor-executable instructions to receive, via the GUI, the configuration schema for the plurality of industrial devices are configured to further cause the one or more processors to: receive, via the GUI, an increment selection; receive, via the GUI, a selection of the range of available values; and the processor-executable instructions further cause the one or more processors to generate the configuration based on the schema form and the increment selection.

Example 18 is the non-transitory computer-readable medium of any previous or subsequent Example, wherein the processor-executable instructions are configured to determine the configuration based on the configuration schema for the respective industrial device are configured to further cause the one or more processors to: determine an incrementation between values within the range of available values; determine a first numerical sequence for a first industrial device within the plurality of industrial devices based on the incrementation and a preceding value transmitted to a respective industrial device; generate the configuration based on the first numerical sequence for the first industrial device; and assign the configuration to the first industrial device within the plurality of industrial devices.

Example 19 is the non-transitory computer-readable medium of any previous or subsequent Example, wherein the processor-executable instructions further cause the one or more processors to: determine a previous transmission, wherein the previous transmission comprises the first numerical sequence to the first industrial device; determine a second numerical sequence for a second industrial device within the plurality of industrial devices based on the incrementation and the first numerical sequence for the first industrial device; generate a second configuration for the second industrial device based on the second numerical sequence for the second industrial device; and assign the second configuration to the second industrial device within the plurality of industrial devices.

Example 20 is the non-transitory computer-readable medium of any previous or subsequent Example, wherein the processor-executable instructions further cause the one or more processors to: receive an error indication from the respective industrial device, wherein the error indication comprises a notification that there is a conflict with the configuration; generate a second configuration for the respective industrial device based on a next available value within the range of available values; assign the second configuration to the respective industrial device; and transmit, via NFC from the client device, the second configuration to the respective industrial device.

Example 21 is the non-transitory computer-readable medium of any previous or subsequent Example, wherein the processor-executable instructions further cause the one or more processors to receive an indication that the configuration was successfully received.

Example 22 is a method of updating a configuration of an industrial device in a powered-off state, the method comprising: receiving, by a near-field communication (NFC) chip housed within the industrial device, an updated configuration, wherein the industrial device comprises: the NFC chip housed within the industrial device; one or more non-transitory computer-readable media housed within the industrial device that is communicatively coupled to the NFC chip; a power-source configurable to hold the industrial device in one of: a powered-on state; or the powered-off state, wherein the powered-on state provides power to the industrial device and the powered-off state does not provide power to the industrial device; and a factory-set configuration stored within the one or more non-transitory computer-readable media housed within the industrial device; storing, by the NFC chip, the updated configuration when the industrial device is in the powered-off state; receiving, by the power-source, an indication to change from the powered-off state to the powered-on state; transmitting, by the NFC chip, the updated configuration to the one or more non-transitory computer-readable media; and updating, by the one or more non-transitory computer-readable media, the factory-set configuration to the updated configuration.

Example 23 is the method of any previous or subsequent Example, wherein the updated configuration comprises an IP address for the industrial device.

Example 24 is the method of any previous or subsequent Example, wherein the method further comprises: determining, by the industrial device, a conflict for the updated configuration; and transmitting, by the industrial device, an error indication based on the conflict to a client device.

Example 25 is the method of any previous or subsequent Example, wherein the NFC chip housed in the industrial device comprises power harvesting capabilities.

Example 26 is a non-transitory computer-readable medium comprising processor-executable instructions configured to cause one or more processors to: receive, by a near-field communication (NFC) chip housed within an industrial device, an updated configuration, wherein the industrial device is in a powered-off state and comprises: the NFC chip housed within the industrial device; one or more non-transitory computer-readable media housed within the industrial device that is communicatively coupled to the NFC chip; a power-source configurable to hold the industrial device in one of: a powered-on state; or the powered-off state, wherein the powered-on state provides power to the industrial device and the powered-off state does not provide power to the industrial device; and a factory-set configuration stored within the one or more non-transitory computer-readable media housed within the industrial device; store, by the NFC chip, the updated configuration when the industrial device is in the powered-off state; receive, by the power-source, an indication to change from the powered-off state to the powered-on state; transmit, by the NFC chip, the updated configuration to the one or more non-transitory computer-readable media; and update, by the one or more non-transitory computer-readable media, the factory-set configuration stored therein to the updated configuration.

Example 27 is the non-transitory computer-readable medium of any previous or subsequent Example, wherein the updated configuration comprises an IP address for the industrial device.

Example 27 is the non-transitory computer-readable medium of any previous or subsequent Example, wherein the processor-executable instructions are configured to further cause one or more processors to: determine, by the industrial device, a conflict for the updated configuration; and transmit, by the industrial device, an error indication based on the conflict to a client device.

Example 27 is the non-transitory computer-readable medium of any previous or subsequent Example, wherein the NFC chip housed in the industrial device comprises power harvesting capabilities.

What is claimed is:

1. A method of modifying configurations of industrial devices using near-field communication (NFC), the method comprising:

generating, by a software application installed on a client device, a graphical user interface (GUI) comprising user entry elements, wherein the user entry elements comprise:

a format element for providing a numerical schema including values for a configuration schema for a parameter;

an increment element for providing a numerical value to increment the values in the numerical schema for the configuration schema for the parameter; and a range element for providing a range of the values for the configuration schema for the parameter;

receiving, via the user entry elements of the GUI, the numerical schema, the numerical value to increment, and the range for the configuration schema for the parameter for a plurality of industrial devices;

determining, by the software application, a first configuration for a first industrial device of the plurality of industrial devices based at least in part on the configuration schema, wherein:

the first industrial device is in a powered off state;

the first configuration comprises a value formatted in the numerical schema and selected from the range of the values for the parameter; and the value is selected based on an order of transmission of the first configuration to the first industrial device;

transmitting, via NFC from the client device to the first industrial device, the first configuration;

receiving, via NFC, an indication that the first configuration was successfully received by the first industrial device;

displaying, via the GUI, the indication, wherein the first industrial device applies the first configuration upon powering on;

determining, by the software application, a second configuration for a second industrial device of the plurality of industrial devices based on incrementing the value by the numerical value to increment; and transmitting, via NFC from the client device to the second industrial device, the second configuration.

2. The method of claim 1, wherein the parameter is an internet protocol (IP) address for the first industrial device, and wherein determining, by the software application, the first configuration based on the configuration schema for the first industrial device comprises incrementing to a next available value within the range of the values based on the numerical value to increment.

3. The method of claim 1, wherein:

receiving, via the user entry elements of the GUI, the numerical schema, the numerical value to increment, and the range for the configuration schema for the plurality of industrial devices further comprises:

receiving, via the format element of the GUI, a selection of a schema form, wherein the schema form comprises the parameter; and receiving, via the increment element of the GUI, a selection of an incrementation; and the method further comprises:

generating, by the software application, the first configuration for the first industrial device by:

determining the value based on the incrementation from a preceding value for a previously transmitted configuration; and inserting the value into the parameter of the schema form.

4. The method of claim 1, wherein receiving, via the user entry elements of the GUI, the numerical schema, the numerical value to increment, and the range for the configuration schema for the plurality of industrial devices further comprises receiving, via the format element of the GUI, a selection of a schema form, wherein the schema form comprises the parameter.

5. The method of claim 4, wherein:

receiving, via the user entry elements of the GUI, the numerical schema, the numerical value to increment, and the range for the configuration schema for the plurality of industrial devices further comprises:

receiving, via the increment element of the GUI, an increment selection; and receiving, via the range element of the GUI a selection of the range of the values for the parameter; and the method further comprises:

generating, by the software application, the configuration schema based on the schema form and the increment selection.

6. The method of claim 1, wherein the first industrial device is a first motor drive coupled to a first motor, and wherein the second industrial device is a second motor drive coupled to a second motor.

7. The method of claim 1, wherein the method further comprises in response to receiving the indication that the first configuration was successfully received by the first industrial device, transmitting, via NFC from the client device to the first industrial device, operating parameters.

8. The method of claim 1, the method further comprising:
- receiving, by the software application, an error indication from the first industrial device, wherein the error indication comprises a notification that there is a conflict with the first configuration;
- generating, by the software application, a next configuration for the first industrial device based on a next available value within the range of the values;
- assigning, by the software application, the next configuration to the first industrial device; and
- transmitting, via NFC from the client device, the next configuration to the first industrial device.

9. The method of claim 1, wherein the second industrial device is in a powered on state.

10. The method of claim 9, the method further comprising:
- receiving, via NFC, a second indication that the second configuration was successfully implemented.

11. The method of claim 1, wherein the client device is a handheld device.

12. A non-transitory computer-readable medium comprising processor-executable instructions configured to cause one or more processors to:
- generate, on a client device, a graphical user interface (GUI) comprising user entry elements, wherein the user entry elements comprise:
  - a format element for providing a numerical schema including values for a configuration schema for a parameter;
  - an increment element for providing a numerical value to increment the values in the numerical schema for the configuration schema for the parameter; and
  - a range element for providing a range of the values for the configuration schema for the parameter;
- receive, via the user entry elements of the GUI, the numerical schema, the numerical value to increment, and the range for the configuration schema for the parameter for a plurality of industrial devices;
- determine a first configuration for a first industrial device within the plurality of industrial devices based at least in part on the configuration schema, wherein:
  - the first industrial device is in a powered off state;
  - the first configuration comprises a value formatted in the numerical schema and selected from the range of the values for the parameter; and
  - the value is selected based on an order of transmission of the first configuration to the first industrial device;
- transmit, via NFC from the client device to the first industrial device, the first configuration;
- receive, via NFC, an indication that the first configuration was successfully received by the first industrial device;
- display, via the GUI, the indication, wherein the first industrial device applies the first configuration upon powering on;
- determine a second configuration for a second industrial device of the plurality of industrial devices based on incrementing the value by the numerical value to increment; and
- transmit, via NFC from the client device to the second industrial device, the second configuration.

13. The non-transitory computer-readable medium of claim 12, wherein the parameter is an internet protocol (IP) address, and to determine the first configuration for the first industrial device based on the configuration schema, the processor-executable instructions further cause the one or more processors to increment to a next available value within the range of the values based on the numerical value to increment.

14. The non-transitory computer-readable medium of claim 12, wherein the second industrial device is in a powered on state.

15. The non-transitory computer-readable medium of claim 12, wherein to receive, via the user entry elements of the GUI, the numerical schema, the numerical value to increment, and the range for the configuration schema for the plurality of industrial devices, the processor-executable instructions further cause the one or more processors to:
- receive, via the format element of the GUI, a selection of a schema form, wherein the schema form comprises the parameter; and
- receive, via the increment element of the GUI, a selection of an incrementation; and
- wherein to generate the first configuration for the first industrial device, the processor-executable instructions further cause the one or more processors to:
  - determine the value based on the incrementation from a preceding value for a previously transmitted configuration; and
  - insert the value into the parameter of the schema form.

16. The non-transitory computer-readable medium of claim 12, wherein to receive, via the user entry elements of the GUI, the numerical schema, the numerical value to increment, and the range for the configuration schema for the plurality of industrial devices, the processor-executable instructions further cause the one or more processors to receive, via the format element of the GUI, a selection of a schema form, wherein the schema form comprises the parameter.

17. The non-transitory computer-readable medium of claim 16, wherein:
- to receive, via the user entry elements of the GUI, the numerical schema, the numerical value to increment, and the range for the configuration schema for the plurality of industrial devices, the processor-executable instructions further cause the one or more processors to:
  - receive, via the increment element of the GUI, an increment selection;
  - receive, via the range element of the GUI, a selection of the range of the values; and
  - generate the first configuration based on the schema form and the increment selection.

18. The non-transitory computer-readable medium of claim 12, wherein the first industrial device is a first motor drive coupled to a first motor, and wherein the second industrial device is a second motor drive coupled to a second motor.

19. The non-transitory computer-readable medium of claim 12, wherein the processor-executable instructions further cause the one or more processors to, in response to receiving the indication that the first configuration was successfully received by the first industrial device, transmit, via NFC from the client device to the first industrial device, operating parameters.

20. The non-transitory computer-readable medium of claim 12, wherein the processor-executable instructions further cause the one or more processors to:

receive an error indication from the first industrial device, wherein the error indication comprises a notification that there is a conflict with the first configuration;

generate a next configuration for the respective industrial device based on a next available value within the range of the values;

assign the next configuration to the first industrial device; and transmit, via NFC from the client device, the next configuration to the first industrial device.

* * * * *